(12) United States Patent
Howard

(10) Patent No.: US 8,182,564 B2
(45) Date of Patent: May 22, 2012

(54) MULTI-LAYER PARTICLE COLLECTOR ASSEMBLY

(75) Inventor: Mark Howard, Bentleyville, OH (US)

(73) Assignee: Zhao Hui Filters (US), Inc., Cleveland, OH (US)

( * ) Notice: Subject to any disclaimer, the term of this patent is extended or adjusted under 35 U.S.C. 154(b) by 36 days.

(21) Appl. No.: 12/660,993

(22) Filed: Mar. 9, 2010

(65) Prior Publication Data

US 2010/0229512 A1    Sep. 16, 2010

Related U.S. Application Data

(60) Provisional application No. 61/209,941, filed on Mar. 12, 2009.

(51) Int. Cl.
*B01D 46/02* (2006.01)

(52) U.S. Cl. ............... 55/371; 55/380; 55/381; 55/482; 55/DIG. 2

(58) Field of Classification Search ............ 55/341.1, 55/341.5, 341.6, 373, 363, 372, 378, 366, 55/367, 380, 381, 382, DIG. 2
See application file for complete search history.

(56) References Cited

U.S. PATENT DOCUMENTS

| | | | |
|---|---|---|---|
| 1,140,726 A | | 5/1915 | Warden |
| 1,968,016 A | | 7/1934 | Dabadie |
| 2,327,225 A | * | 8/1943 | Taylor .............................. 55/371 |
| 3,443,366 A | * | 5/1969 | Schwab .......................... 55/309 |
| 3,479,802 A | | 11/1969 | Fesco |
| 4,240,812 A | | 12/1980 | Schaefer et al. |
| 4,303,425 A | * | 12/1981 | Cox, Jr. ............................ 55/378 |
| 4,311,493 A | | 1/1982 | Schaefer et al. |
| 4,749,386 A | | 6/1988 | Strohmeyer et al. |
| 4,978,231 A | | 12/1990 | Ling et al. |
| 5,192,424 A | | 3/1993 | Beyne et al. |
| 5,358,638 A | * | 10/1994 | Gershenson .................. 210/448 |
| 5,363,980 A | | 11/1994 | Mulcahy |
| 5,417,855 A | * | 5/1995 | Gershenson .................. 210/315 |
| 5,522,908 A | | 6/1996 | Frey |
| 5,755,962 A | * | 5/1998 | Gershenson et al. ......... 210/452 |
| 6,102,239 A | | 8/2000 | Wien |
| 6,523,187 B1 | | 2/2003 | Brink et al. |
| 6,630,233 B1 | | 10/2003 | Levandowski et al. |
| 6,808,073 B2 | | 10/2004 | Cuisinier |
| 2004/0223664 A1 | | 11/2004 | Martin et al. |

* cited by examiner

*Primary Examiner* — Duane Smith
*Assistant Examiner* — Pankti Patel
(74) *Attorney, Agent, or Firm* — D. Peter Hochberg; Sean F. Mellino; Daniel J. Smola

(57) ABSTRACT

A multi-layer bag assembly is used with a housing for collecting particles from air flowing through the multi-layer bag assembly. Multi-layer bag assembly includes at least two bags arranged one inside the other. Each of the bags includes an air permeable filtering material for collecting particles carried by air flowing through the material. The air permeable filtering material being may be the same or different for the at least two bags. The multi-layer bag assembly includes structure for holding the at least two bags in a wide open position. The structure may be a cooperating bag structure incorporated in the at least two bags for cooperating with the housing for selectively holding the respective bags in their respective open conditions. The structure may also be a removable collar attached to at the open portion of the at least two bags, where the removable collar is part of an integral collar of the multi-layer bag assembly. The removable collar of the innermost bag is separable from the remaining portion of the integral collar for enabling the withdrawal of the innermost bag of the at least two bags.

9 Claims, 10 Drawing Sheets

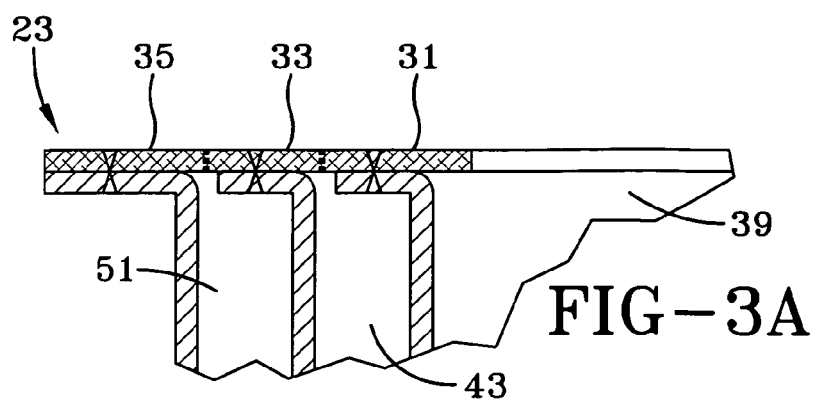
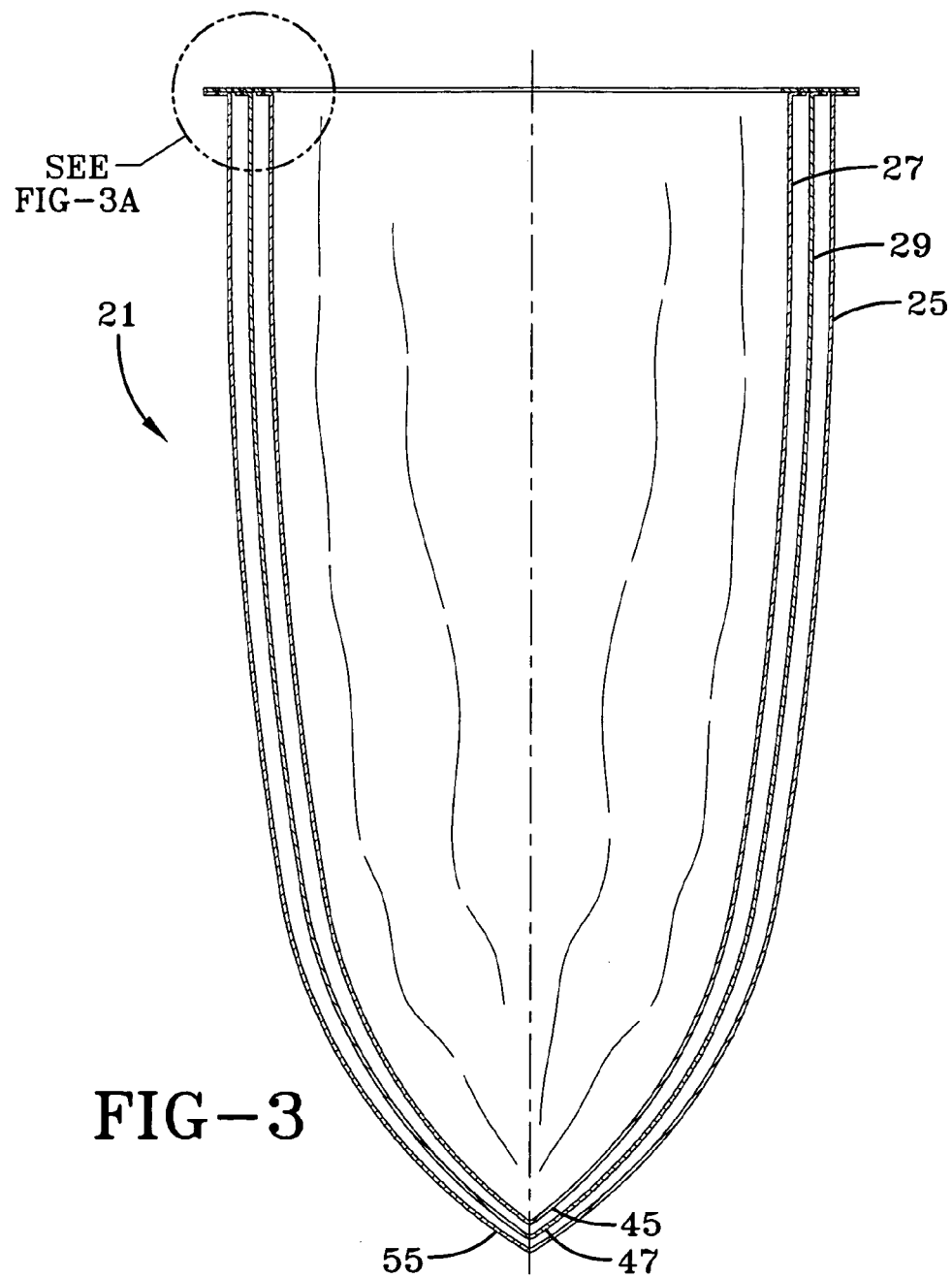

MULTI-LAYER PARTICLE COLLECTOR ASSEMBLY

This application is a non-provisional U.S. patent application claiming priority from U.S. Provisional Application No. 61/209,941, filed Mar. 12, 2009.

BACKGROUND OF THE INVENTION

1. Field of the Invention

The present invention relates in general to particle collectors and in particular to particle collectors having a multi-layer construction. More particularly, this invention relates to a multi-layer particle assembly for collecting various types of dust, dirt and other debris, such as those used in vacuum cleaners.

2. Description of the Prior Art

Nearly all particle collectors such as those used in vacuum cleaners and other disposal systems using bags, both where the bag is a mere container and those where the bag includes a filtering body, use single bags. There have been some suggestions for the use of multi-layer particle collectors for use in a few different fields. The previously proposed multi-layer particle collectors tend to include a polymer material, such as polyethylene, and would be individually manufactured to a particular thickness depending on the intended use.

One of the applications of multi-layer particle collectors is for waste disposal. Disposable garbage bags are well known and are almost always used one at a time. There have been suggestions of garbage assemblies having a multi-layer construction to prevent tearing the garbage bag when filled with garbage. There are suggestions for the use of a multi-layer bag for repeated use for disposing of garbage. U.S. Pat. Nos. 4,978,231, 5,363,980, 6,102,239, 6,808,073 and U.S. Publication No. 2004/0223664 all pertain to multi-layer bag configuration with nested disposable bags. These multi-layer bags fit within various typical garbage cans. After a nested disposable bag is full of garbage, a user removes the nested disposable bag to reveal another empty disposable bag ready for use. However, these bags are collectors of goods, and do not act as filters of particles entrained in flowing air.

Another suggestion is the use of multi-layer particle collectors as filter layer bags. It has been proposed to use multiple filters for removing various types of debris from the air, water, etc. Use of a filter within another filter will allegedly increase the efficiency of the filter system by catching any debris that may pass through the first filter. As the air, water, etc. passes through each subsequent filter, the air, water, etc. allegedly becomes cleaner by removing any debris that may have been in the air, water, etc. U.S. Pat. Nos. 1,140,726, 1,986,016, 3,443,366, 5,192,424 and 5,417,855 disclose use of multiple filter bags for various filter applications. The filters may be nested one inside the other. However, these patents do not teach multi-layer assemblies where the innermost bag is easily detached and discarded when its surface is full of particles.

Multi-layer particle collectors have been proposed for the vacuum industry, although none having tear-away bags are believed to exist or to have even been proposed. U.S. Pat. No. 3,479,802 discloses a multi-compartment vacuum cleaner filter bag which includes a filter bag located within another filter bag to provide maximum filtration when used with a vacuum cleaner. U.S. Pat. No. 4,749,386 teaches an air-permeable jacket which houses a paper filter bag and a safety filter to protect against dirt entering the air permeable jacket. U.S. Pat. No. 6,630,233 discloses a disposable vacuum cleaner bag with a freshening liner to freshen the air that passes through vacuum cleaner bag. U.S. Pat. Nos. 4,240,812 and 4,311,493 pertain to a vacuum clean outermost bag having an inside pocket to store spare filter bags. U.S. Pat. No. 5,522,908 discloses a vacuum clean filter bag having multiple, nested innermost bags and an outer bag for sequentially filtering a discharge from a vacuum cleaner. Each of the innermost bags is said to rupture when full with debris, in a manner to allow the debris to bypass the ruptured bag and enter into the next bag. However, each bag is not the same size and is not separately removable when full as disclosed in the present claimed invention.

There exists a need for a simple cost-effective multi-layer particle collector which can be used to allow a user to separately remove a single particle collector when filled with debris and dispose of such layer collector, exposing another particle collector in the use position. It is to this need that the present invention is directed.

SUMMARY OF THE INVENTION

An object of the present invention is to provide an improved particle collector.

Another object of the present invention is to provide a multi-layer particle collector which includes disposable particle collectors.

A further object of the present invention is to provide multi-layer particle collector which does not have to be shaken out to remove dust, dirt and other debris when full.

It is still a further object of the present invention to provide a multi-layer particle collector which is inexpensive and easy to manufacture.

It is yet still another object to provide multi-layer particle collector which does not require immediate removal of the entire multi-layer particle collector when full from dust, dirt and other debris.

An additional object is to provide an improved particle collector for removing particles of air flowing through the collector.

It is a further object to provide a multi-layer particle collector for use with vacuum cleaners, the particle collector bag being capable of having a longer life than a typical vacuum filter bag.

A still further object is to provide a multi-layer bag assembly for a vacuum cleaner having removable innermost bags.

It is yet another object to provide a multi-layer bag assembly which includes a removable collar with the respective bags for easily removing a single particle collector when full from dust, dirt and other debris from the multi-layer particle collector while leaving another particle collector in a ready-to-use position.

Still yet a further object of the present invention is to provide a multi-layer particle collector for a cleaning apparatus.

Yet another object of the present invention is to provide a multi-layer particle collector for a commercial vacuum cleaner having a housing into which particle laden air is forced to flow.

Another object is to provide a multi-layer particle collector having removable bags, which collector can be used with a commercial backpack vacuum.

It is another object of the present invention to provide a multi-layer particle collector which may be easily folded to reduce packaging, shipping and storage space.

These and other objects will be known from the description to follow and from the appended claims.

The present invention is a multi-layer bag assembly to be used with a housing for collecting particles from air flowing through the multi-layer bag assembly, where the multi-layer bag assembly includes at least two bags arranged one inside the other. Each bag has an open end portion facing in one direction which is movable between a wide open condition and a closed condition, a closed end portion, and a closed side portion interconnecting the respective closed end portions and the open end portions. Each of the bags includes an air permeable filtering material for collecting particles carried by air flowing through the material. The air permeable filtering material being may be the same or different for the at least two bags. The multi-layer bag assembly includes structure for holding the respective open end portions of the at least two bags in a wide open position. The structure may be a cooperating bag structure incorporated in the at least two bags for cooperating with the housing for selectively holding the respective open end portions of the respective bags in their respective open conditions. The cooperating bag structure could be an elastic band at the open end portion of the bag for being attached to the open end of a vacuum cleaner. The structure may also be a removable collar attached to each of the open portion of the respective at least two bags, where the removable collars are part of an integral collar of the multi-layer bag assembly. The removable collar of the innermost bag is separable from the remaining portion of the integral collar for enabling the withdrawal of the innermost bag of the at least two bags.

The foregoing embodiments provide a more economical and easier multi-layer bag assembly than conventional vacuum filter bags, and prevent the need to "shake out" the multi-layer bag assembly when full of dust, dirt or other debris or dispose of the multi-layer bag assembly at one time. This enables a user to clean in a shorter amount of time, without the danger of dumping the contents of multi-layer bag assembly into the air or on the recently cleaned area.

BRIEF DESCRIPTION OF THE DRAWINGS

FIG. 3 is cross-section view of the multi-layer particle collector along line 3-3 as shown in FIG. 1.

FIG. 3A is an enlarged partial view of FIG. 3 showing collector bags attached to integral collar.

DETAILED DESCRIPTION OF THE PREFERRED EMBODIMENTS

Figure 4:
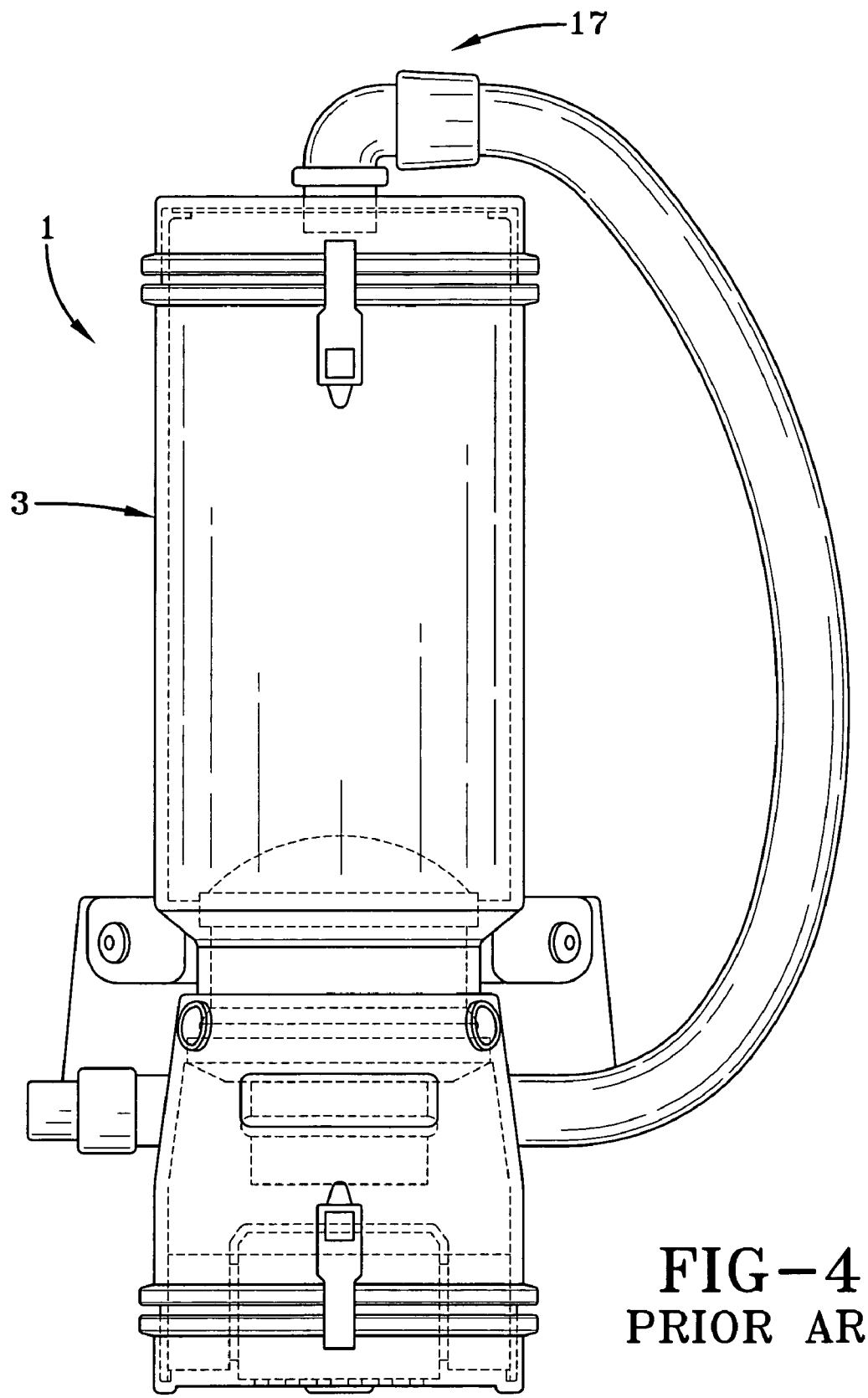
FIG. 4 is a front view of a vacuum cleaner housing.
Figure 5:
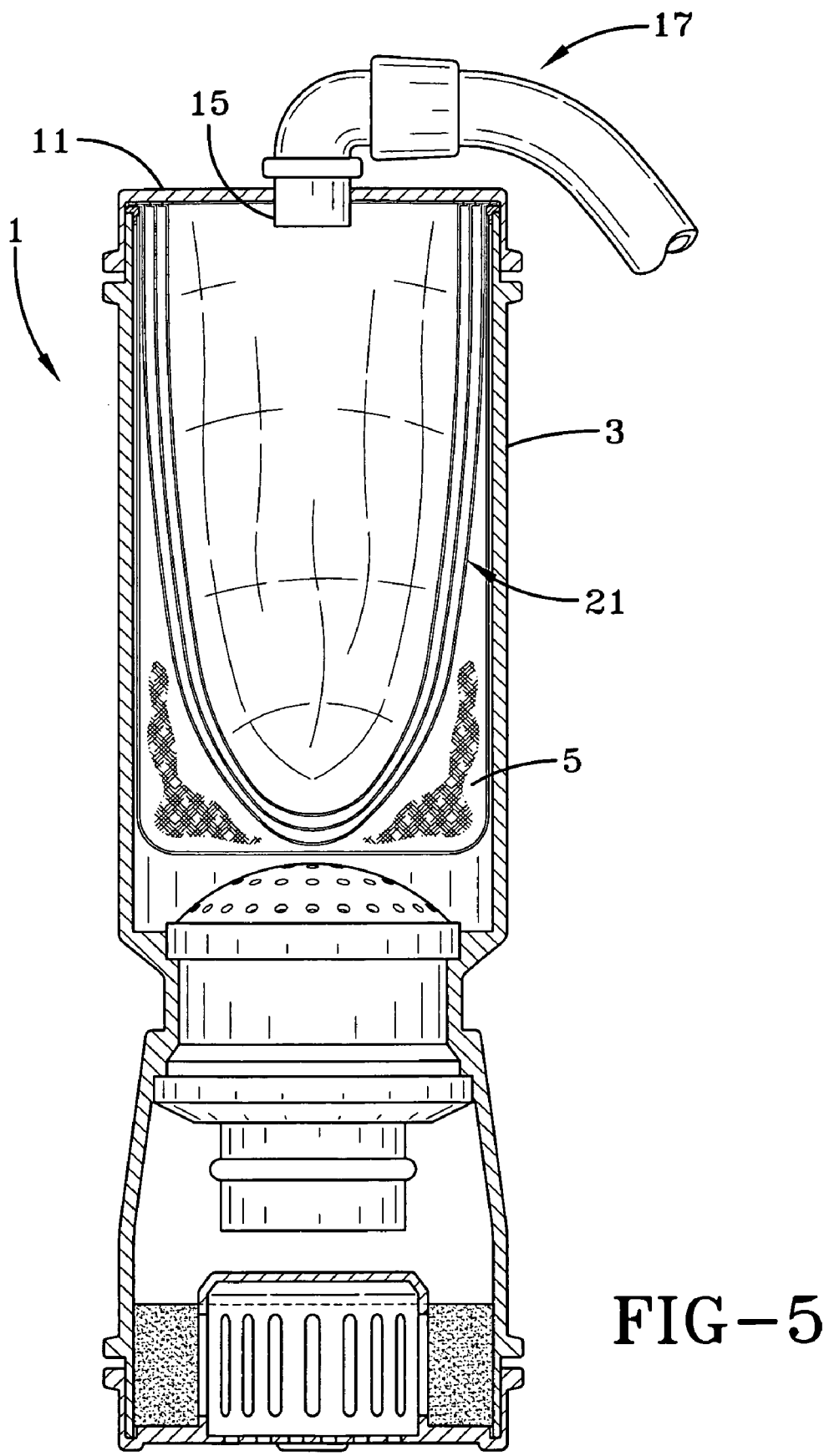
FIG. 5 is a cross-section of the vacuum cleaner housing as shown in FIG. 4.
Figure 6:
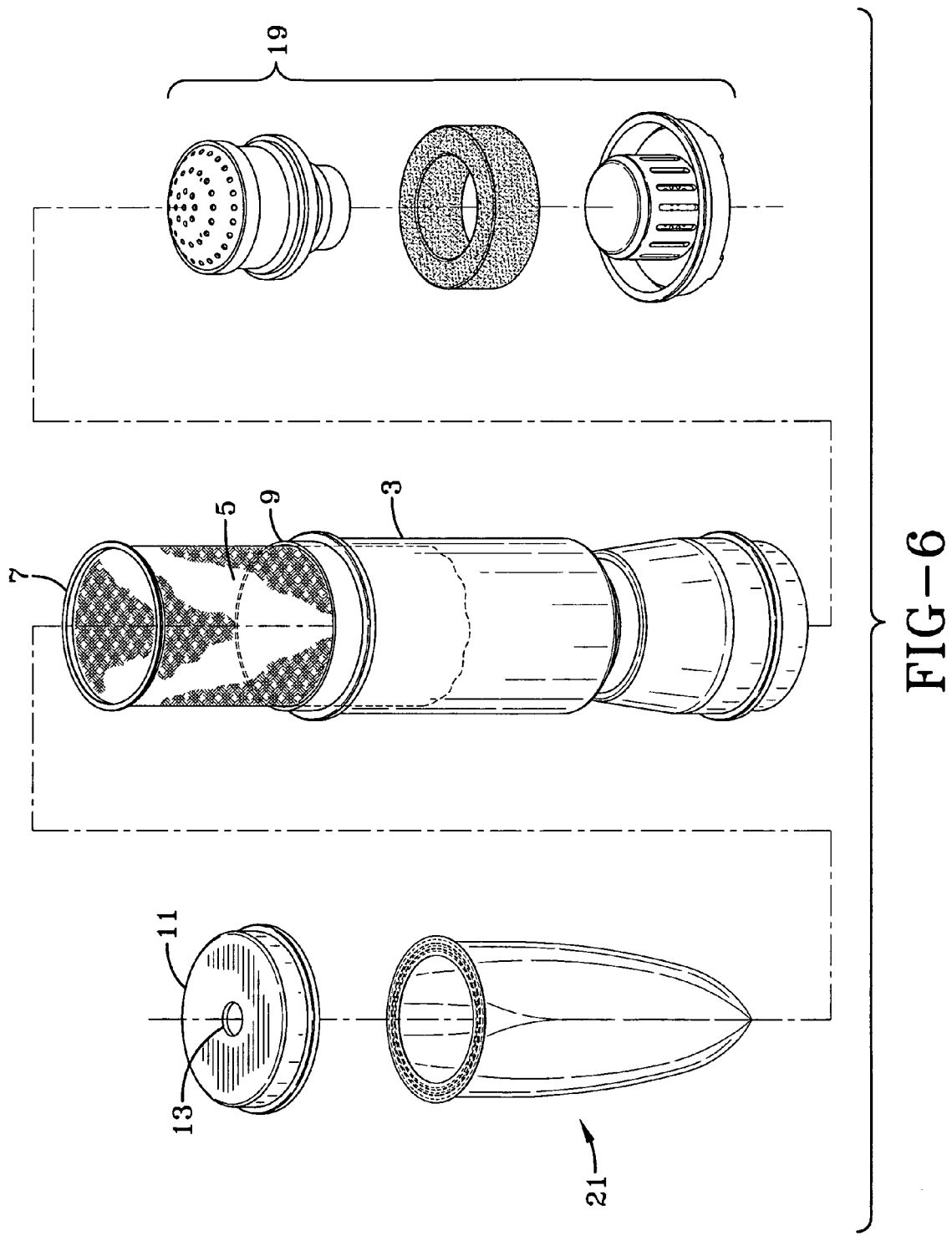
FIG. 6 is an exploded perspective view of the vacuum cleaner housing and the elements located within vacuum housing.
Figure 7:
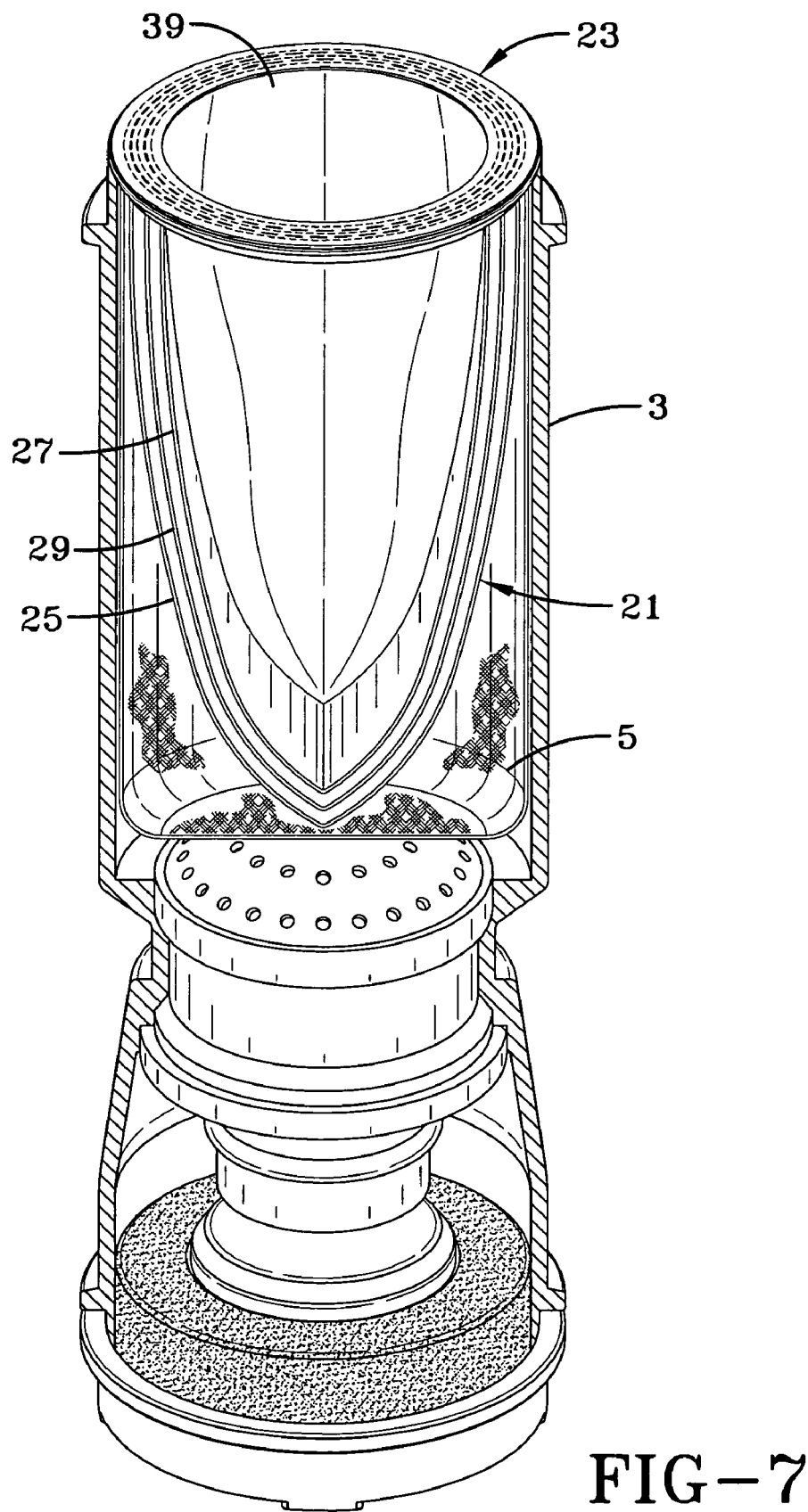
FIG. 7 is a perspective view of the vacuum cleaner housing partially cut away showing the elements located within vacuum cleaner housing.
Figure 8:
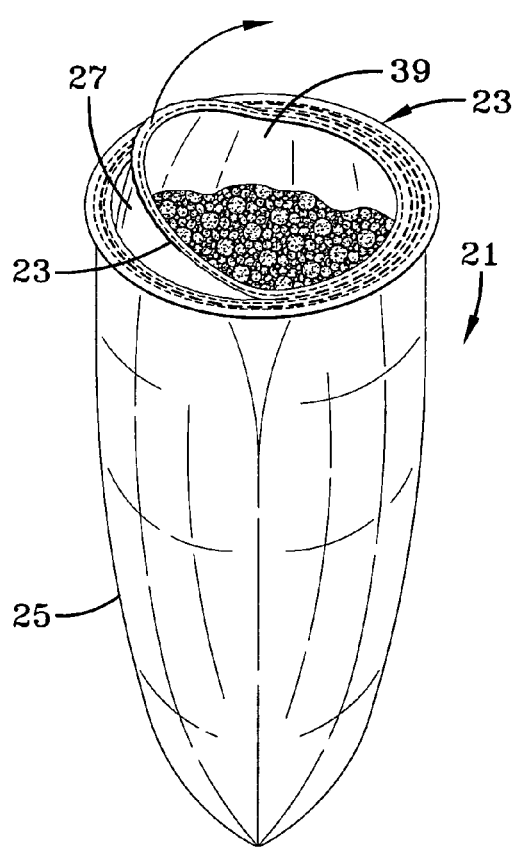
FIG. 8 is a perspective view of an innermost removable collector bag containing debris being partially removed from the multi-layer particle collector as shown in FIG. 1.
Figure 9:
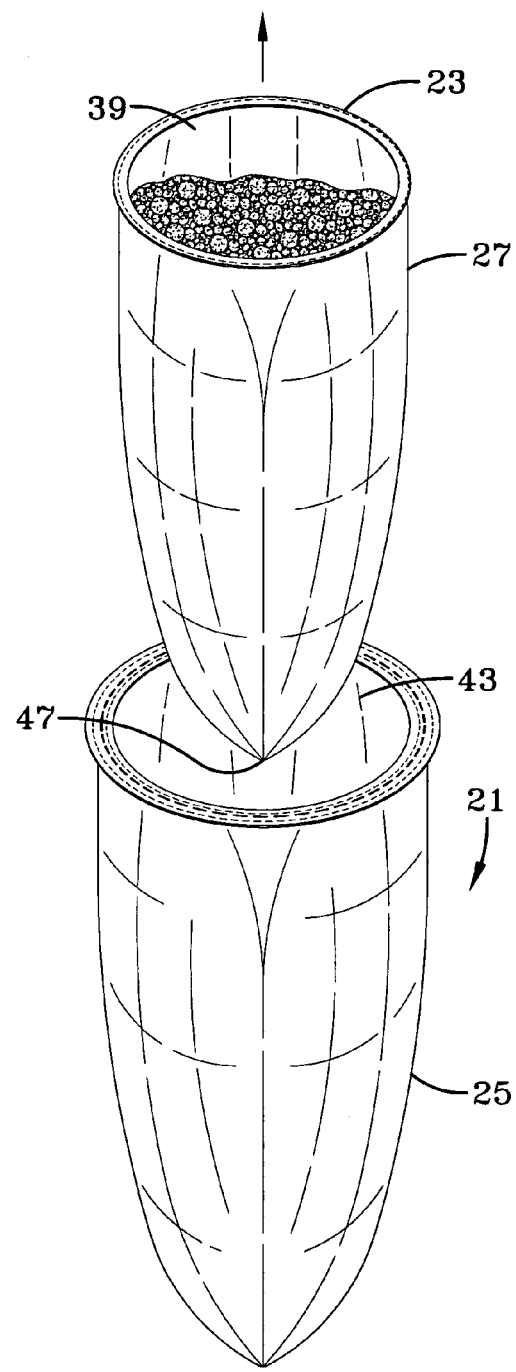
FIG. 9 is a perspective view of an innermost removable collector bag containing debris being completely removed from the multi-layer particle collector as shown in FIG. 1
Figure 10:
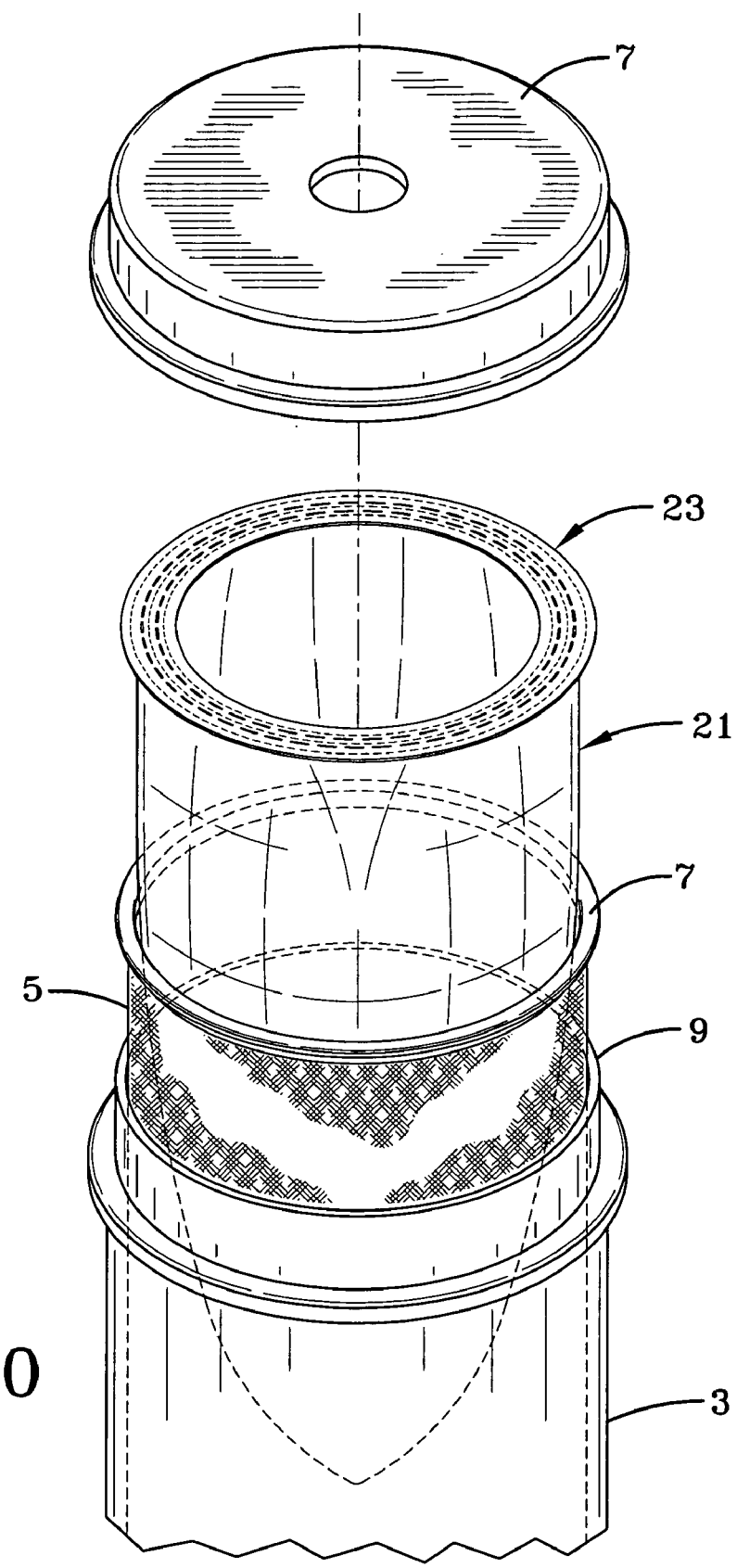
FIG. 10 is a partially exploded view showing how the multi-layer particle collector fits within vacuum cleaner housing.

The preferred embodiments of the present invention were prepared as an improvement to the conventional disposable vacuum filter bag although the present invention is not limited to the vacuum industry. As shown in FIGS. 4-5, a typical vacuum cleaner 1 according to the prior art includes a housing 3 for storing a machine support and air permeable bag 5. A gasket 7 is attached near the opening of machine support and air permeable bag 5. Gasket 7 prevents air from escaping housing 3 when vacuum cleaner 1 operates. Additionally, gasket 7 is seated on a housing rim 9 and positions machine support and air permeable bag within housing 3. A housing cap 11 is used to seal machine support and air permeable bag 5 within housing 3 as well as a typical disposable filter bag used with the vacuum. Housing cap 11 has a hole 13 into which an end portion 15 of an air conveying hose assembly 17 extends. Additional filtering apparatus 19 is located in the bottom of housing 3.

Figure 1:
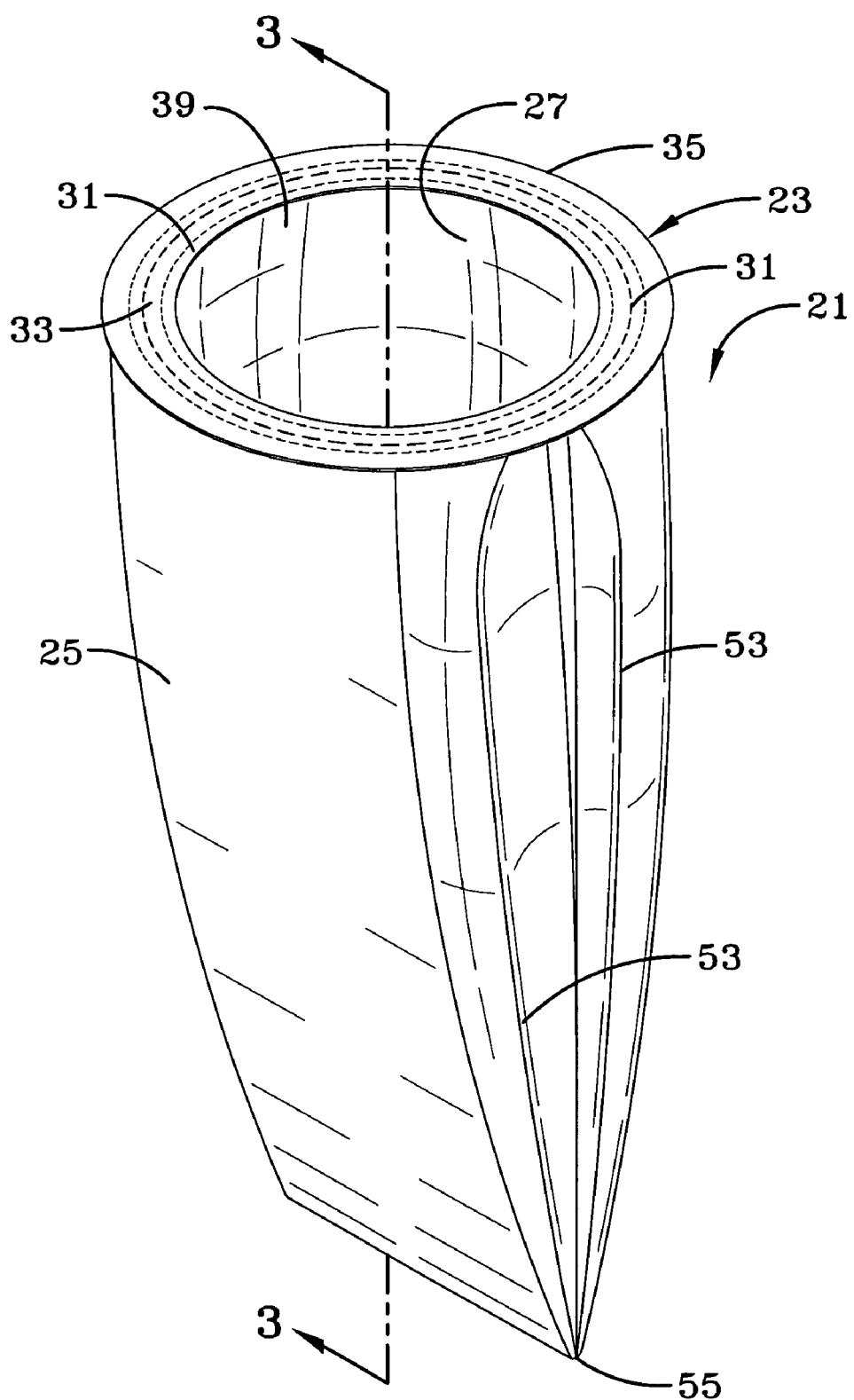
FIG. 1 is a perspective view of the multi-layer particle collector according to a first embodiment of the present invention.
Figure 2:
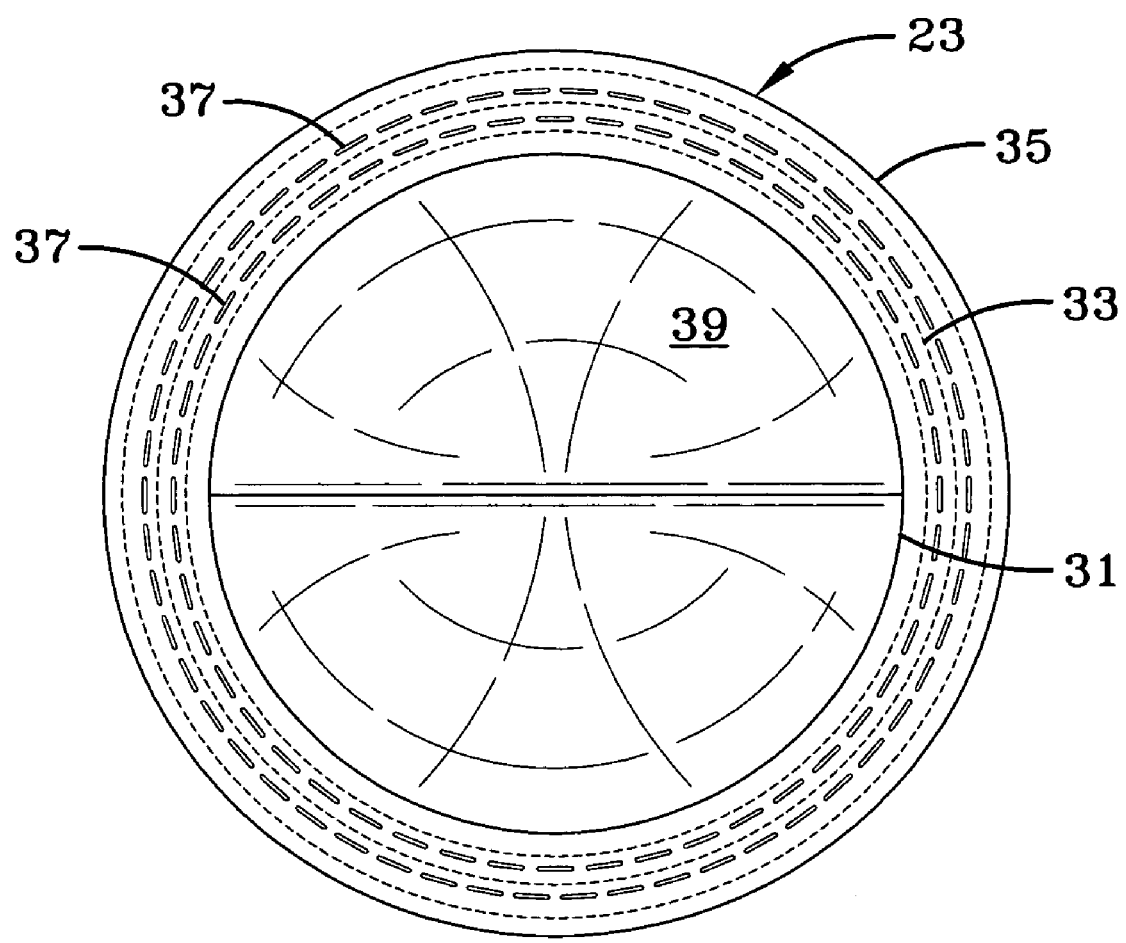
FIG. 2 is a top view of the multi-layer particle collector shown in FIG. 1.

Turning now to FIGS. 1-3, a first embodiment of the present invention is shown. A multi-layer bag assembly 21 is shown. Multi-layer bag assembly 21 includes an integral collar 23, a disposable support and air permeable bag 25, an innermost collector bag 27 and an outermost collector bag 29. Innermost collector bag 27 is arranged inside outermost collector bag 29. Outermost collector bag 29 is arranged inside disposable support and air permeable bag 25. 1-n (where n is any number) number of intermediate bags may be located between innermost collector bag 27 and outermost collector bag 29.

Integral collar 23 is generally flat and flexible and comprises an innermost removable collar 31, an outermost removable collar 33 and a disposable support and air permeable bag collar 35. If n number of intermediate bags are included between innermost collector bag 27 and outermost collector bag 29, each intermediate bag will have a removable collar. Detachable connectors 37 located on integral collar 23 operatively connect innermost removable collar 31, outermost removable collar 33 and disposable support and air permeable bag collar 35 to each other. Similarly, detachable connectors 37 would operatively connect any intermediate collars to each other and innermost removable collar 31, outermost removable collar 33 and disposable support and air permeable bag collar 35. Detachable connectors 37 can be made in any number of ways including a stitched connection between adjacent removable collars 31, 33 and collar 35, a perforated connection between adjacent removable collars 31, 33 and collar 35, an adhesive connection between adjacent removable collars 31, 33 and collar 35 or relatively thinned regions between relatively thick adjacent removable collars 31, 33 and collar 35. Other connectors which would be suitable are VELCRO®, snaps, buttons and the like.

Removable collars 31, 33, 35 are increasing in diameter size, if removable collars 31, 33, 35 are circular in shape. That is, innermost removable collar 31 is the smallest in size and removable collars 33, 35 increase sequentially in size. Removable collars 31, 33, 35 are concentric in shape. Concentric means like-shapes larger than one another and connected to each other, but the like-shapes do not have to be circular.

Innermost collector bag 27 includes an opening 39 at the top of innermost collector bag 27. Opening 39 allows air filled with dust, dirt and other debris into innermost collector bag.

Innermost collector bag 27 is air permeable to allow air to pass through innermost collector bag 27. However, innermost collector bag 27 comprises a thin filtering material which prevents dust, dirt and other debris from passing through it. The filtering material may be melt blown or spun bond non-woven liner made from polypropylene or polyester. Composites of these materials may be used or other suitable filtering materials may be used. A tri-lock fold 45 is located at the bottom of innermost collector bag 27 to prevent debris from escaping. Debris can only enter and exit innermost collector bag 27 at opening 39.

Outermost collector bag 29 also includes an opening 43 and is also made of a filtering material which prevents dust, dirt and other debris from passing through. The filtering material may be meltblown or spunbond non-woven liner made from polypropylene or polyester. Composites of these materials may be used or other suitable filtering materials may be used. A tri-lock fold 47 is located at the bottom of outermost collector bag 29 to prevent debris from escaping. Any other type of suitable multi-fold could be used as well. Debris can only enter and exit outermost collector bag 29 at opening 43.

Innermost removable collar 31 is operatively connected to innermost collector bag 27. It has been found that stitching is suitable for connecting innermost removable collar 31 to innermost collector bag 27. Similarly, outermost removable collar 33 may also be stitched to outermost collector bag 29 and any intermediate removable collars may also be stitched to any respective intermediate collector bags. Disposable support and air permeable bag collar 35 may also be stitched to disposable support and air permeable bag 25. However, any other suitable connecting means may be used such as an adhesive. Removable collars 31, 33 and disposable support and air permeable bag collar 35 are generally flat and flexible and made from cardboard. However, any suitable material such as plastic may also be used.

Figure 11:
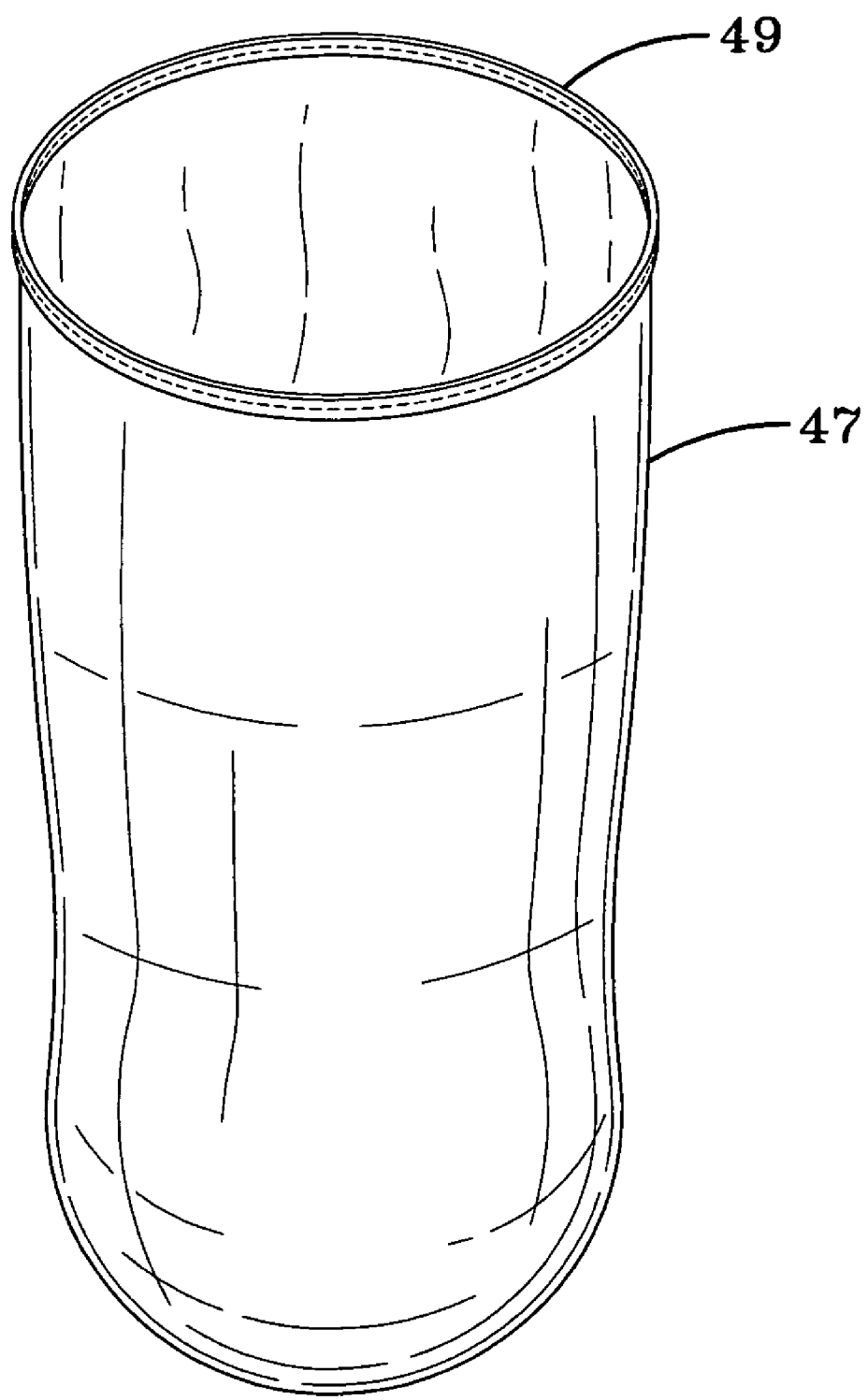
FIG. 11 is a perspective view of a collector bag with an elastic band instead of a removable collar.

In an alternative embodiment shown in FIG. 11, a collector bag 47 does not include a removable collar. Instead, an elastic band 49 is used. Elastic band 49 is tightenable about housing rim 9. Additional collector bags not shown also include an elastic band instead of removable collars. Similarly, disposable support and air permeable bag 25 can also have an elastic band instead of a collar.

Disposable support and air permeable bag 25 is made from a cellulosic blend or filter paper. An opening 51 is located at the top of disposable support and air permeable bag 25. Disposable support and air permeable bag 25 is stitched to collar 35. Disposable support and air permeable bag 25 includes gussets 53 on the side for reinforcement and support. The bottom of bag 25 is sealed by a tri-lock fold 55. Debris can only enter and exit disposable support and air permeable bag 25 at opening 43.

When packaged for sale or shipment, multi-layer bag assembly 21 is folded over itself in one direction and integral collar 23 is folded in the opposite direction to allow integral collar 23 to lie generally flat against multi-layer bag assembly 21. Since collector bags 27, 29 are located within multi-layer bag assembly 21 and are made from a thin filtering material, collector bags 27, 29 easily fold with the folding of the multi-layer bag assembly 21.

The following will describe the use of multi-layer bag assembly 21. Before use, a user will remove housing cap 11 from housing 3 to access machine support and air permeable bag 5. The user will place multi-layer bag assembly 21 within machine support and air permeable bag 5 until the bottom surface of disposable support and air permeable collar 35 is flush with the top surface of gasket 7. The user will then attach housing cap 11 to housing 3. During use of the vacuum cleaner, multi-layer bag assembly 21 will begin to fill with dust, dirt and other debris. When multi-layer bag assembly 21 is full, user will remove housing cap 11 from housing 3. User will then detach innermost removable collar 31 from integral collar 23 at detachable connector 37 and pull out innermost collector bag 27 which will be full of dust, dirt and other debris. No shake out of multi-layer bag assembly 21 is required. User will dispose of full innermost collector bag 27 into the garbage or other suitable container. After removal of innermost collector bag 27, outermost collector bag 29 (or an intermediate collector bag) will be exposed and ready to be filled with dust, dirt and other debris. The user will replace housing cap 11 back onto housing 3 and vacuum will be ready for use again. These steps will be repeated for any intermediate collector bag and outermost collector bag 29. When outermost collector bag 29 has been removed in the fashion stated above because it is full from dust dirt and other debris, disposable support and air permeable bag 25 remains. Disposable support and air permeable bag 25 can then be used to collect dust, dirt and other debris similar to collector bags 27, 29. When disposable support and air permeable bag 25 is full, user can remove and dispose of disposable support and air permeable bag 25 and insert a new multi-layer particle collector assembly 11.

As seen from the above description, multi-layer particle collector assembly 11 extends the life of a typical vacuum filter bag by including at least two extra collector bags in addition to disposable support and air permeable bag 25. The cost to include extra collector bags is much cheaper than replacing a disposable support and air permeable bag every time it is full. A typical disposable support and air permeable bag costs around $20.00 or more. Furthermore, use of multi-layer particle collector assembly 11 discourages against "shake out" since multi-layer particle collector assembly 11 will have more uses than a one time disposable support and air permeable bag.

The present invention can be used with various types of commercial backpack vacuum cleaners such as Super Coach-Vac®, Super CoachVac® HEPA, CoachVac® and Mega-Vac®. These vacuums are manufactured by ProTeam the Vacuum Company® located at 5118 North Sawyer Avenue Boise, Idaho 83714. However the present invention can also be used in an upright vacuum or other various types of vacuums which use a filter bag to collect dirt, dust and debris.

The present invention is not limited to the vacuum industry. Other areas for application of the present invention include dust collection (which covers the present invention), pollution control, liquid solid separation and air infiltration. Also, applications of the present invention in medical industry may include waste collection and possible use with surgical masks to include a disposable layer.

The invention has been described in detail with particular emphasis on the preferred embodiments, but variation and modifications may occur to those skilled in the art to which the invention pertains.

The invention claimed is:

1. A multi-layer bag assembly for use with a housing having an external structure for collecting particles from air flowing through said multi-layer bag assembly, said multi-layer bag assembly comprising:

at least two bags arranged one inside the other and having an innermost bag, each of said at least two bags having an open end portion facing in one and the same direction, the respective open end portions being movable between a wide open condition and a closed condition, a closed end portion, and a closed side portion interconnecting said respective closed end portions and said open end portions, each of said bags being composed of an air permeable filtering material for collecting particles carried by air flowing through the material, the air permeable filtering material being the same or different for the respective at least two bags;

structure for holding the respective open end portions of said at least two bags in a wide open position, said structure comprising an integral collar composed of removable collars attached to the respective open ends of said at least two bags, said removable collar of said innermost bag being separable from the remaining portion of said integral collar for enabling the withdrawal and disposal of said innermost bag with said removable collar of said innermost bag remaining attached to said innermost bag.

2. A multi-bag assembly according to claim 1 wherein said removable collars of said integral collar are circular and concentric.

3. A multi-layer bag assembly according to claim 2 wherein said circular and concentric removable collars are disposed in a common plane.

4. A multi-layer bag assembly according to claim 2 wherein said integral collar is generally flat and flexible, said circular and concentric removable collars being generally connected to the adjacent removable collars with a separable connector.

5. A multi-layer bag assembly according to claim 4 wherein said integral collar is made from cardboard.

6. A multi-layer bag assembly according to claim 4 wherein said separable connector is selected from a stitched connection between adjacent removable collars, a perforated connector between adjacent removable collars, an adhesive connector between adjacent removable collars and tearable thinned regions between adjacent removable collars, said integral collar being a solid element having said tearable thinned regions.

7. A multi-bag assembly according to claim 1 wherein the air permeable filtering material of said innermost bag is capable of being filled with particles only one time for effective use thereof, said innermost bag and said removable collar of said innermost bag being disposable after being used one time to collect particles from air flowing therethrough.

8. A multi-bag assembly according to claim 1, said at least two bags including an outermost disposable support and air permeable bag and at least one collector bag inside of said disposable support and air permeable bag, the air permeable filtering material of said innermost collector bag being capable of being filled with particles only one time for effective use thereof, said collector bag and said removable collar of said collector bag being disposable after being used one time to collect particles from air flowing therethrough; and said outermost disposable support and air permeable bag being capable of being used more than one time for collecting particles from air flowing therethrough, said disposable support and air permeable bag capable of being emptied of particles collected therein between successive uses thereof.

9. A multi-layer bag assembly for use with a housing having an external structure, the external structure having a rim-like construction with a wide open position for collecting particles from air flowing through said multi-layer bag assembly, said multi-layer bag assembly comprising:

at least two bags arranged one inside the other and having an innermost bag, each of said at least two bags having an open end portion facing in one and the same direction, the respective open end portions being movable between a wide open condition and a closed condition, a closed end portion, and a closed side portion interconnecting said respective closed end portions and said open end portions, each of said at least two bags being composed of an air permeable filtering material for collecting particles carried by air flowing through the air permeable filtering material, the air permeable filtering material being the same or different for the respective at least two bags;

elastic band structure for holding the respective open end portions of said at least two bags in the wide open condition, said elastic band structure comprising an elastic band incorporated in or on said respective open end portion of said innermost bag of said at least two bags, said elastic band of said innermost bag of said at least two bags being tightenable about the rim-like construction of the housing, and said elastic band of said innermost bag of said at least two bags being removable from the rim-like structure and being closeable subsequent to removal from the rim-like construction of the housing.

* * * * *